J. L. ANTHONY.
STOVE DOOR.
APPLICATION FILED MAY 15, 1918.

1,348,838.

Patented Aug. 10, 1920.
2 SHEETS—SHEET 1.

INVENTOR:
Joseph L. Anthony
By Coale + Hayes
HIS ATTORNEYS

J. L. ANTHONY.
STOVE DOOR.
APPLICATION FILED MAY 15, 1918.
1,348,838.
Patented Aug. 10, 1920.
2 SHEETS—SHEET 2.
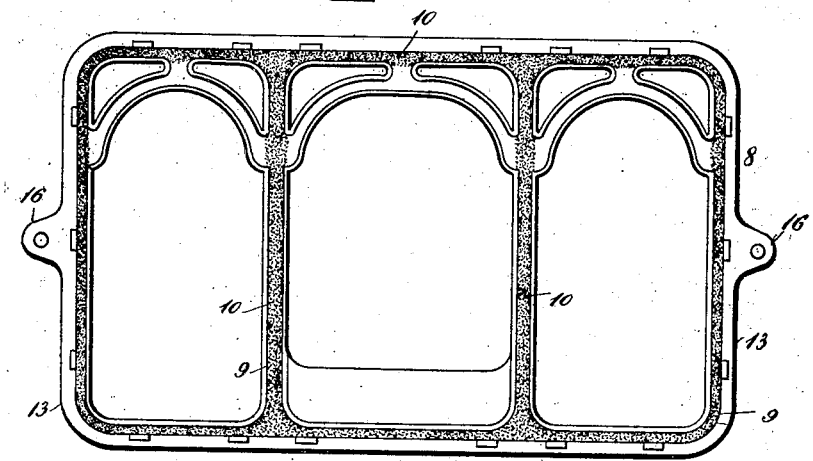
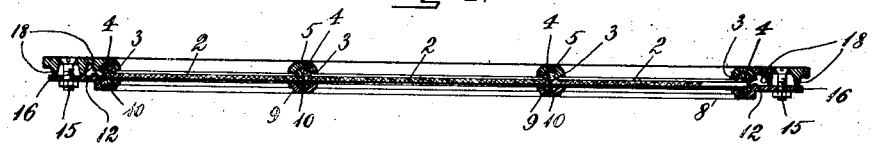
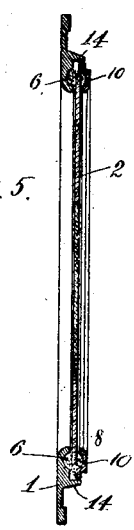
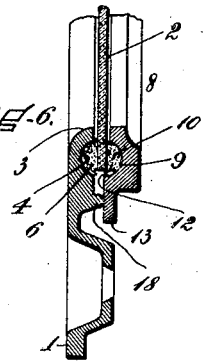
INVENTOR=
Joseph L. Anthony
By Coale & Hayes
his Attorneys=

UNITED STATES PATENT OFFICE.

JOSEPH L. ANTHONY, OF TAUNTON, MASSACHUSETTS, ASSIGNOR TO WEIR STOVE COMPANY, OF TAUNTON, MASSACHUSETTS, A CORPORATION OF MASSACHUSETTS.

STOVE-DOOR.

1,348,838.   Specification of Letters Patent.   Patented Aug. 10, 1920.

Application filed May 15, 1918. Serial No. 234,601.

*To all whom it may concern:*

Be it known that I, JOSEPH L. ANTHONY, of Taunton, in the county of Bristol and State of Massachusetts, a citizen of the United States, have invented a new and useful Improvement in Stove-Doors, of which the following is a full, clear, and exact description, reference being had to the accompanying drawings, forming a part of this specification, in explaining its nature.

The present invention relates to stove doors having an opening or window in them containing a transparency, and especially to the oven doors of gas stoves. The invention pertains to the transparency with which the door is fitted and the means for its retention.

The object of my invention is to provide means whereby the opening in the door may be closed with a transparency of glass instead of mica which is usually employed.

It has hitherto been attempted to use glass in stove doors but with little success owing to the conditions of heat and cold to which the glass is subjected, which causes the glass to crack, the ordinary means for retaining the glass being entirely inadequate under existing conditions. In accordance with my invention glass may be employed for closing the opening in the door and the means for retaining it is such that the glass will maintain its integrity under all conditions.

My invention can best be seen and understood by reference to the drawings, in which—

Fig. 3 is a plan of the interior of the outer glass-retaining plate.

Fig. 4 is a section on the line 4—4 of Fig. 1.

Fig. 5 is a section on the line 5—5 of Fig. 1, and

Fig. 6 is a section in enlarged detail taken on the line 6—6 of Fig. 1.

Figure 1:
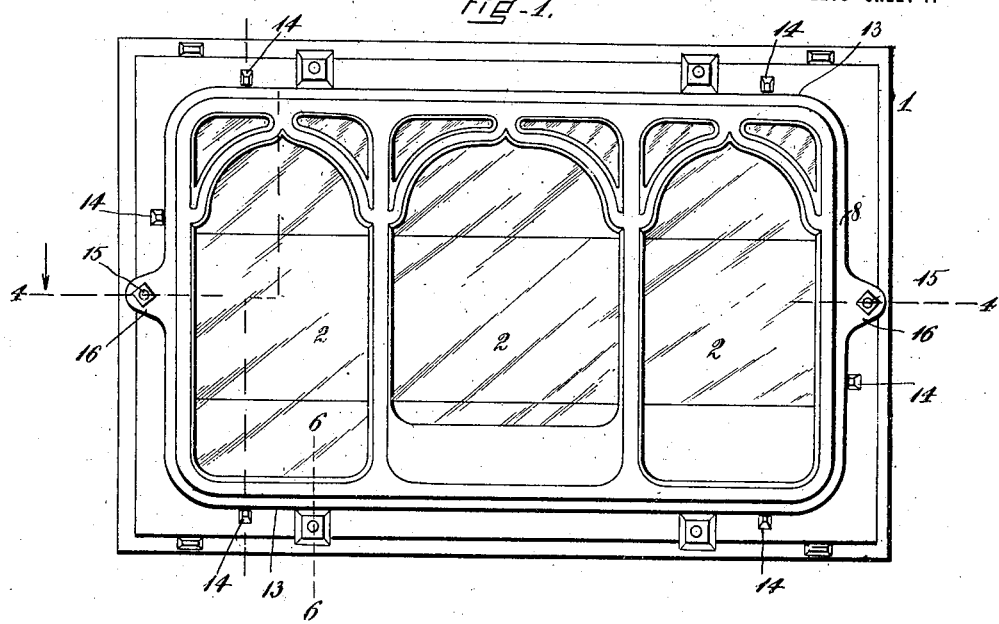
Figure 1 represents in plan a stove door embodying my invention.
Figure 2:
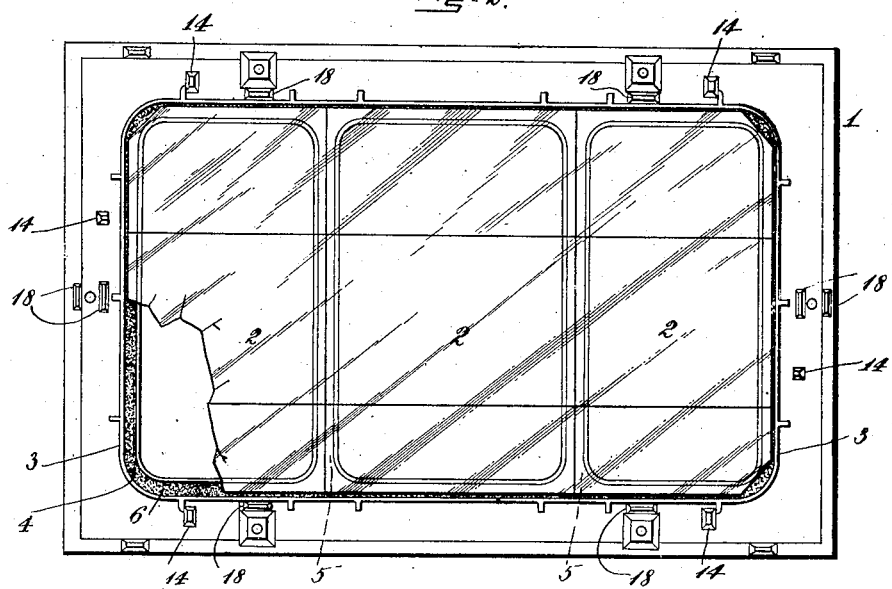
Fig. 2 is the same as Fig. 1 with the outer glass-retaining plate removed, to which special reference will later be made.

Referring to the drawings:

1 represents the stove door the body of which has an opening in it for the reception of a transparency. 2 represents the transparency which is made of glass and is sectional in character, that is, the entire transparency presented by the glass is made up of a series of glass sections which in the structure shown are substantially rectangular in shape. The glass is retained as follows: Cast on the outer side of the body of the door around the opening in it and just inwardly removed from the edge framing the opening is a raised rib 3 having a channel 4 formed in it. Extending across the opening are one or more channels or grooved bars 5 of which two are shown in the present instance. Each of these bars is provided with the same rib 3 as the body of the door and occupies the same plane.

Inserted in the channel of the raised rib 3, on both the body of the door and the crossbars is a pad 6 of some yielding heat-resisting material such as asbestos fiber. This pad extends above the top surface of the rib whereby it may present a cushion surmounting the rib on which the glass may rest. Retained as it is in the channel of the rib, there is no chance for the pad to become displaced, the same being held securely in place.

The glass sections are laid to occupy a common plane with the edges of the sections abutting one another, and the cutting of the glass is such that when the sections are laid they will rest along certain of their edges upon the pad 6 surmounting the rib 3 on both the body of the door and the crossbars.

The glass sections thus laid are held in place by a retaining plate or frame 8 of skeleton form which presents sections or parts corresponding and coincident with the ribs formed upon the body of the door whereby it may act to retain the glass sections along those edges which are resting upon the pad 6 as aforesaid. The several sections or parts of the retaining plate are provided with channels 9 on the inside thereof and into these channels are inserted pads 10 of asbestos or other suitable material the same as the pad 6. The pad 10 extends beyond the channel in which it is contained in order that it may be held by the plate to lie between the plate and the glass and provide a cushion between the same when the plate is secured, as will later be explained, for holding the glass in place as against outward displacement.

The channels or grooves in the body 1 and the retaining plate 8 preferably extend entirely around the said body and plate near their outer edges or peripheries.

The retaining plate 8 operates, when held in place, not only to maintain the glass against outward displacement but also against lateral displacement. For this purpose the plate 8 is preferably provided all around, near its periphery, with a shoulder 12 which projects inwardly beyond the outer faces of the glass sections and is slightly spaced therefrom and this serves to hold the glass sections against lateral displacement though allowing for their expansion and contraction. Outside of the shoulder 12 the plate 8 is provided with a peripheral edge portion 13 which extends over the face of the body of the door.

The retaining plate 8 is itself held against lateral displacement by lugs 14 on the body of the door against which the outwardly-turned edge 13 of the plate has bearing.

The plate 8 is secured to the door in a manner whereby the glass may be held properly in place between the pads 6 and 10 though in such a way as not to bind the glass too tightly, but rather to hold the same snugly between the pads which yieldingly hold the glass, permitting all expansion or contraction of the combined parts.

The immediate fastening of the plate to the body of the door is obtained by a bolt-and-nut connection 15 which fastens into ears 16 on the outer edges of the plate. In order, however, to prevent the plate drawing too tightly against the glass as the nuts are tightened, the plate is maintained to have a proper and determinate spaced relationship to the body of the door and incidentally to the glass. This effect is obtained by lugs 18 on the body of the door with which the peripheral edge portion 13 of the plate 8 has engagement when the plate has been drawn into position for obtaining a proper retention of the glass upon the tightening of the nuts.

Having thus fully described my invention, I claim and desire to secure by Letters Patent of the United States:—

1. A stove door comprising a body having an opening therein, one or more grooved bars crossing said opening, a transparency covering said opening and comprising a plurality of glass sections disposed in a common plane with their adjacent edges abutting opposite said bar or bars, an outer retaining plate laid over said glass sections and having one or more grooved bars disposed opposite the bar or bars of said body, the adjacent faces of said body and plate being provided with peripheral grooves, pads of yielding heat-resisting material in the grooves of said body, plate and bars, said pads engaging the edges of said glass sections, and means for securing said plate to said body.

2. A stove door comprising a body having an opening therein, one or more grooved bars crossing said opening, a transparency covering said opening and comprising a plurality of glass sections disposed in a common plane with their adjacent edges abutting opposite said bar or bars, an outer retaining plate laid over said glass sections and having one or more grooved bars disposed opposite the bar or bars of said body, the adjacent faces of said body and plate being provided with peripheral grooves, said retaining plate being provided with a peripheral shoulder extending inward beyond the outer face of the glass and spaced therefrom, pads of yielding heat-resisting material in the grooves of said body, plate and bars, said pads engaging the edges of said glass sections, and means for securing said plate to said body.

JOSEPH L. ANTHONY.